US012695024B2

(12) United States Patent
Kwon et al.

(10) Patent No.: US 12,695,024 B2
(45) Date of Patent: Jul. 28, 2026

(54) COIL COMPONENT

(71) Applicant: SAMSUNG ELECTRO-MECHANICS CO., LTD., Suwon-si (KR)

(72) Inventors: Soon Kwang Kwon, Suwon-si (KR); Tae Hyun Kim, Suwon-si (KR); Dong Hwan Lee, Suwon-si (KR); Byeong Cheol Moon, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 761 days.

(21) Appl. No.: 18/097,896

(22) Filed: Jan. 17, 2023

(65) Prior Publication Data

US 2023/0420177 A1 Dec. 28, 2023

(30) Foreign Application Priority Data

Jun. 22, 2022 (KR) ........................ 10-2022-0075931

(51) Int. Cl.

*H01F 27/29* (2006.01)
*H01F 27/24* (2006.01)
*H01F 27/30* (2006.01)

(52) U.S. Cl.

CPC ........... *H01F 27/292* (2013.01); *H01F 27/24* (2013.01); *H01F 27/306* (2013.01)

(58) Field of Classification Search

CPC ....... H01F 27/292; H01F 27/24; H01F 27/306
See application file for complete search history.

(56) References Cited

U.S. PATENT DOCUMENTS

2012/0133472 A1 5/2012 Nishikawa et al.
2014/0002227 A1* 1/2014 Hsieh ...................... H01F 5/003 336/200

(Continued)

FOREIGN PATENT DOCUMENTS

JP 2012-114363 A 6/2012
JP 2014049598 A * 3/2014

(Continued)

OTHER PUBLICATIONS

Office Action issued in corresponding Korean Patent Application No. 10-2022-0075931 on Feb. 10, 2026, with English translation.

*Primary Examiner* — Malcolm Barnes

(74) *Attorney, Agent, or Firm* — MORGAN, LEWIS & BOCKIUS LLP

(57) ABSTRACT

A coil component includes a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface, a support member disposed in the body, a coil disposed on the support member and including first and second lead-out portions extending to the third surface of the body, and first and second external electrodes disposed on the sixth surface of the body, extending into the recess and connected to the first and second lead-out portions, respectively.

20 Claims, 7 Drawing Sheets

(56) References Cited

U.S. PATENT DOCUMENTS

| | | | | |
|---|---|---|---|---|
| 2014/0366365 | A1* | 12/2014 | Sasamori | H01F 41/0246 29/605 |
| 2015/0048915 | A1* | 2/2015 | Yoon | H01F 17/0013 336/192 |
| 2015/0102891 | A1* | 4/2015 | Yoon | H01F 27/2804 336/200 |
| 2017/0053732 | A1* | 2/2017 | Moon | H01F 17/04 |
| 2018/0130596 | A1* | 5/2018 | Yamaguchi | H01F 27/2804 |
| 2019/0259525 | A1* | 8/2019 | Yoon | H01F 27/292 |
| 2019/0279813 | A1 | 9/2019 | Jang et al. | |
| 2020/0020477 | A1* | 1/2020 | Kang | H01F 17/0013 |
| 2020/0027649 | A1* | 1/2020 | Yang | H01F 27/361 |
| 2020/0035404 | A1 | 1/2020 | Lim et al. | |
| 2020/0194167 | A1* | 6/2020 | Lee | H01F 27/292 |
| 2020/0303113 | A1* | 9/2020 | Yang | H01F 27/292 |
| 2020/0402699 | A1* | 12/2020 | Kim | H01F 17/04 |
| 2021/0057138 | A1* | 2/2021 | Yang | H01F 41/041 |
| 2021/0375535 | A1 | 12/2021 | Yoo et al. | |
| 2022/0172883 | A1* | 6/2022 | Kang | H01F 17/0013 |

FOREIGN PATENT DOCUMENTS

| | | | | | |
|---|---|---|---|---|---|
| KR | 20150007448 | A | * | 1/2015 | H01F 27/33 |
| KR | 101532171 | B1 | * | 7/2015 | H01F 17/0013 |
| KR | 20170023502 | A | * | 3/2017 | H01F 27/29 |
| KR | 20170097299 | A | * | 8/2017 | H01F 27/2804 |
| KR | 10-1963263 | B1 | | 3/2019 | |
| KR | 10-2019-0106613 | A | | 9/2019 | |
| KR | 10-2052834 | B1 | | 12/2019 | |
| KR | 10-2021-0147614 | A | | 12/2021 | |
| KR | 10-2022-0074411 | A | | 6/2022 | |

* cited by examiner

COIL COMPONENT

CROSS-REFERENCE TO RELATED APPLICATION(S)

This application claims benefit of priority to Korean Patent Application No. 10-2022-0075931 filed on Jun. 22, 2022 in the Korean Intellectual Property Office, the disclosure of which is incorporated herein by reference in its entirety.

TECHNICAL FIELD

The present disclosure relates to a coil component.

BACKGROUND

An inductor, a coil component, is a passive electronic component used in electronic devices along with a resistor and a capacitor.

As electronic devices have been designed to have high-performance and a reduced size, the number of electronic components used in electronic devices has been increased and sizes thereof have been reduced.

Meanwhile, as a driving frequency of the coil component increases, there has been a demand for a coil component having a high self-resonant frequency (SRF).

SUMMARY

An aspect of the present disclosure is to provide a coil component having high self-resonant frequency (SRF) by reducing parasitic capacitance $C_p$ generated between a coil and an external electrode.

Another aspect of the present disclosure is to provide a coil component having improved inductance properties and Isat properties by reducing a decrease in effective volume by forming a recess and increasing a volume of a core.

According to an aspect of the present disclosure, a coil component includes a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface, a support member disposed in the body, a coil disposed on the support member and including first and second lead-out portions extending to the third surface of the body, and first and second external electrodes disposed on the sixth surface of the body, extending into the recess and connected to the first and second lead-out portions, respectively.

According to another aspect of the present disclosure, a coil component includes a body including a first surface and a second surface opposing each other in a first direction, a third surface and a fourth surface opposing each other in a second direction, and a fifth surface and a sixth surface opposing each other in a third direction, a support member disposed in the body, a coil disposed on the support member and including a winding portion and first and second lead-out portions extending from the winding portion to the third surface of the body, and first and second external electrodes disposed on the sixth surface of the body and connected to the first and second lead-out portions, respectively. A distance G3 between the winding portion of the coil and the third surface of the body is wider than a distance G4 between the winding portion of the coil and the fourth surface of the body. The winding portion has a line width substantially the same as a line with of the first and second lead-out portions.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
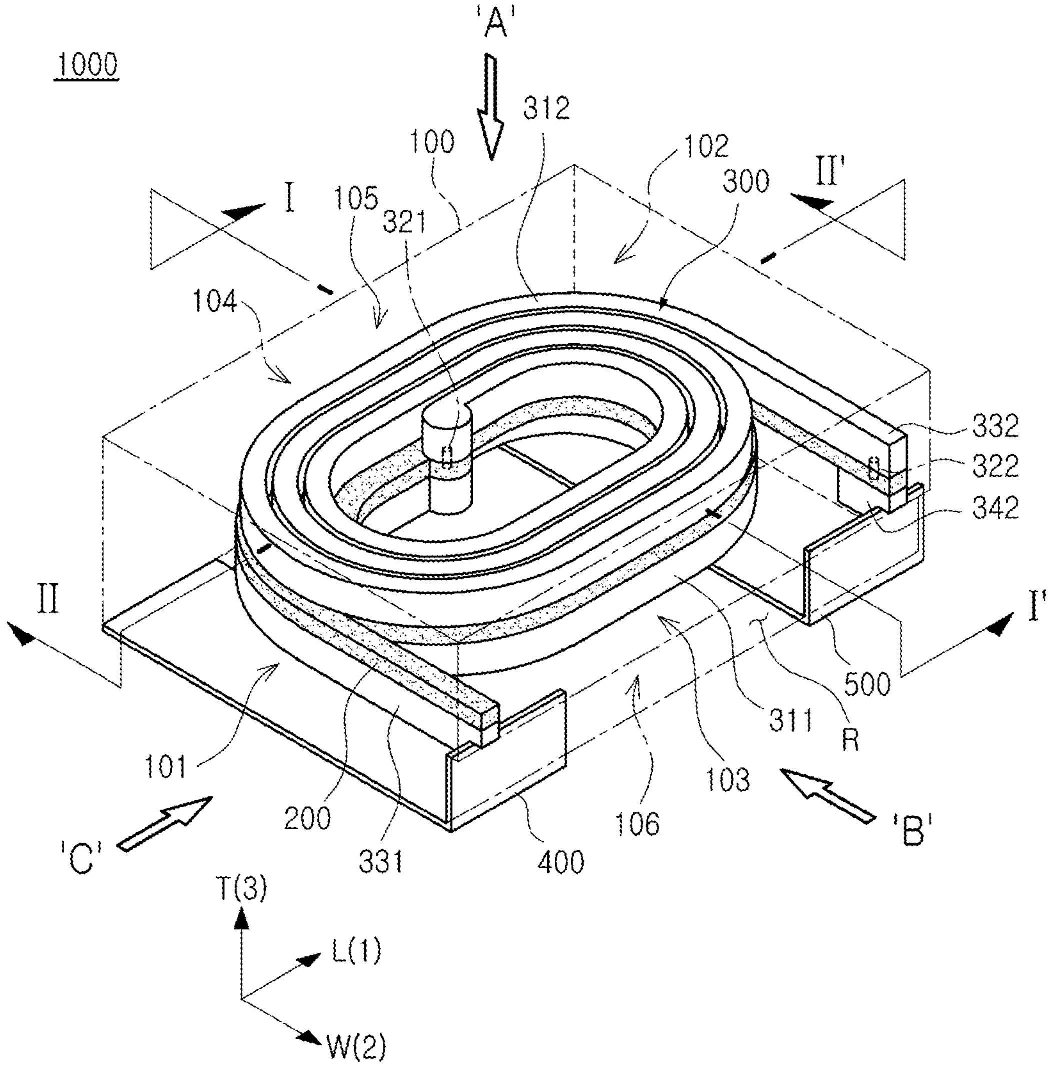
FIG. 1 is a perspective diagram illustrating a coil component according to an example embodiment of the present disclosure.

The terms used in the example embodiments are used to simply describe an example embodiment, and are not intended to limit the present disclosure. A singular term includes a plural form unless otherwise indicated. The terms, "include," "comprise," "may be configured to," and the like, of the description are used to indicate the presence of features, numbers, steps, operations, elements, portions or combination thereof, and do not exclude the possibilities of combination or addition of one or more features, numbers, steps, operations, elements, portions or combination thereof. Also, the term "disposed on," "disposed on," and the like, may indicate that an element is disposed on or beneath an object, and may not necessarily mean that the element is disposed on the object with reference to a gravity direction.

The term "coupled to," "combined to," and the like, may not only indicate that elements are directly and physically in contact with each other, but also include the configuration in which the other element is interposed between the elements such that the elements are also in contact with the other component.

The size and thickness of each component in the drawings may be arbitrarily indicated for ease of description, and thus, the present disclosure is not necessarily limited to the illustrated examples.

In the drawings, an L direction is a first direction or a length direction, a W direction is a second direction or a width direction, and a T direction is a third direction or a thickness direction.

Hereinafter, a coil component according to an example embodiment will be described in detail with reference to the accompanying drawings, and in the description with reference to the accompanying drawings, the same or corresponding components may be provided with the same reference numerals and overlapping description thereof will not be provided.

In electronic devices, various types of electronic components may be used, and various types of coil components may be used between the electronic components to remove noise, or for other purposes.

In other words, in electronic devices, a coil component may be used as a power inductor, a high frequency inductor (HF inductor), a general bead, a high frequency bead (GHz bead), a common mode filter, and the like.

First Embodiment

Figure 2:
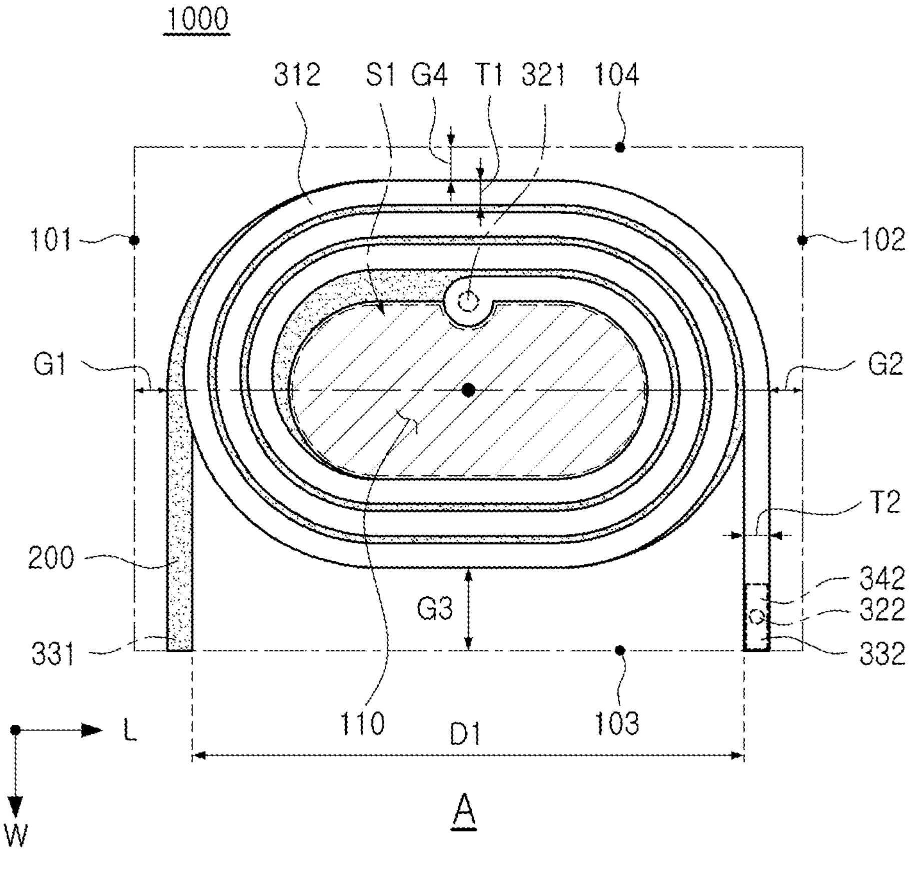
FIG. 2 is a plan diagram corresponding to FIG. 1, viewed in direction A.
Figure 3:
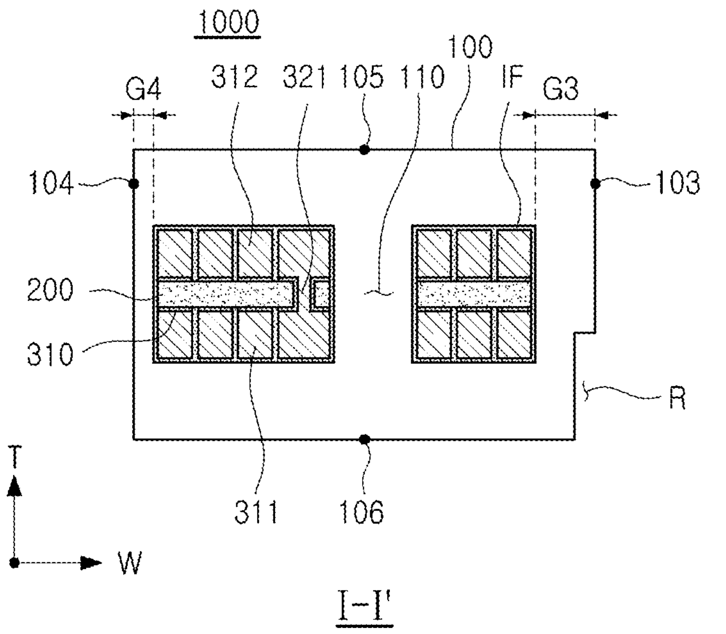
FIG. 3 is a cross-sectional diagram taken along line I-I' in FIG. 1.
Figure 4:
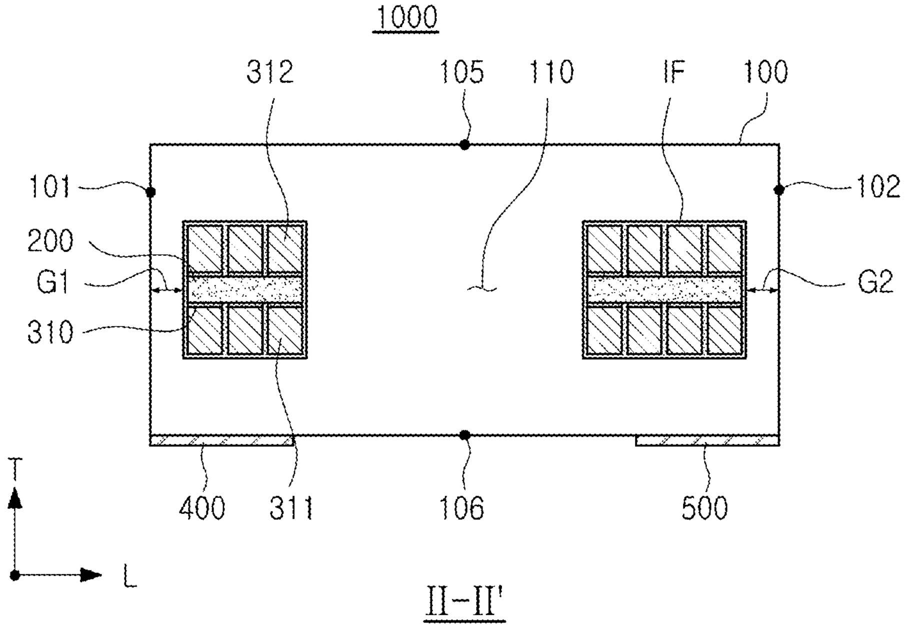
FIG. 4 is a cross-sectional diagram taken along line II-II' in FIG. 1.
Figure 5:
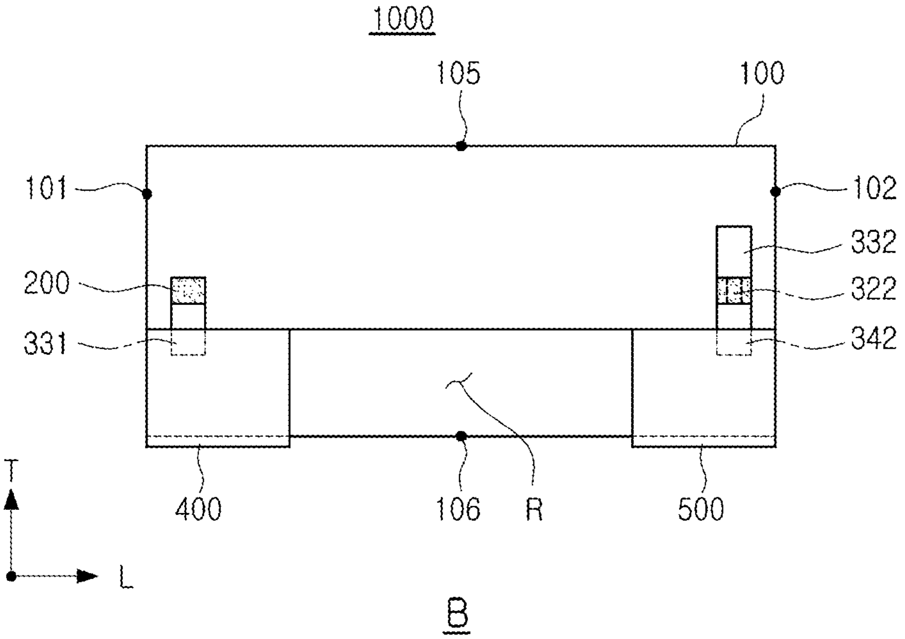
FIG. 5 is a diagram corresponding to FIG. 1, viewed in direction B.

FIG. 1 is a perspective diagram illustrating a coil component 1000 according to an example embodiment. FIG. 2 is a plan diagram corresponding to FIG. 1, viewed in direction A. FIG. 3 is a cross-sectional diagram taken along line I-I' in FIG. 1. FIG. 4 is a cross-sectional diagram taken along line II-II' in FIG. 1. FIG. 5 is a diagram corresponding to FIG. 1, viewed in direction B.

To more clearly illustrate the coupling between the components, the external insulating layer disposed on the body 100 applied to the example embodiment is not illustrated.

Referring to FIGS. 1 to 6, the coil component 1000 according to the first embodiment may include a.

The body 100 may form an exterior of the coil component 1000 in the example embodiment, and the coil portion 300 may be disposed therein. The coil 300 may be supported by the support member 200, but an example embodiment thereof is not limited thereto.

The body 100 may have a hexahedral shape.

The body 100 may include a first surface 101 and a second surface 102 opposing each other in the first direction (the length direction L), a third surface 103 and a fourth surface 104 opposing each other in the second direction (in the width direction W), and a fifth surface 105 and a sixth surface 106 opposing each other in the third direction (in the thickness direction T), with respect to the directions in FIG. 1. Each of the first to fourth surfaces 101, 102, 103 and 104 of the body 100 may be a wall surface of the body 100 connecting the fifth surface 105 to the sixth surface 106 of the body 100. Hereinafter, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100.

The body 100 may be formed such that the coil component in which the external electrodes 400 and 500 are formed may have a length of 2.5 mm, a width of 2.0 mm and a thickness of 1.0 mm, may have a length of 2.0 mm, a width of 1.2 mm and a thickness of 1.0 mm, may have a length of 2.0 mm, a width of 1.2 mm and a thickness of 0.65 mm, may a length of 1.6 mm, a width of 0.8 mm and a thickness of 0.8 mm, may have a length of 1.0 mm, a width of 0.5 mm and a thickness of 0.5 mm, or may have a length of 0.8 mm, a width of 0.4 mm and a thickness of 0.65 mm, but an example embodiment thereof is not limited thereto. Since the above-described numerical value examples for the length, width, and thickness of the coil component 1000 do not reflect process errors, and a numerical value in a range recognized as a process error may correspond to the above-described numerical value examples.

The length of the above-described coil component 1000 may be a maximum value among dimensions of a plurality of line segments connecting two outermost boundary lines of the coil component 1000, opposing each other in the length direction L, to each other and in parallel to the length direction L, with respect to an optical microscope image or a scanning electron microscope (SEM) image with respect to a cross-section in the length direction L-thickness direction T taken from the central portion of the coil component 1000 taken in the width direction W. Alternatively, the length of the coil component 1000 may refer to a minimum value among the dimensions of the plurality of line segments connecting two outermost boundary lines of the coil component 1000, opposing each other in the length direction L, to each other and in parallel to the length direction L. Alternatively, the length of the coil component 1000 may refer to an arithmetic mean value of at least three or more of the dimensions of the plurality of line segments described above. Here, the plurality of line segments parallel to the length direction L may be spaced apart from each other by an equal distance in the thickness direction T, but an example embodiment thereof is not limited thereto.

The thickness of the above-described coil component 1000 may be a maximum value among dimensions of a plurality of line segments connecting two outermost boundary lines of the coil component 1000, opposing each other in the thickness direction T, to each other and in parallel to the thickness direction T, with respect to an optical microscope image or a scanning electron microscope (SEM) image with respect to a cross-section in the length direction L-thickness direction T taken from the central portion of the coil component 1000 taken in the width direction W. Alternatively, the thickness of the coil component 1000 may refer to a minimum value among the dimensions of the plurality of line segments connecting two outermost boundary lines of the coil component 1000, opposing each other in the thickness direction T, to each other and in parallel to the thickness direction T. Alternatively, the thickness of the coil component 1000 may refer to an arithmetic mean value of at least three or more of the dimensions of the plurality of line segments described above. Here, the plurality of line segments parallel to the thickness direction T may be spaced apart from each other by an equal distance in the length direction L, but an example embodiment thereof is not limited thereto.

The width of the above-described coil component 1000 may be a maximum value among dimensions of a plurality of line segments connecting two outermost boundary lines of the coil component 1000, opposing each other in the width direction W, to each other and in parallel to the width direction W, with respect to an optical microscope image or a scanning electron microscope (SEM) image with respect to a cross-section in the length direction L-width direction W taken from the central portion of the coil component 1000 taken in the thickness direction T. Alternatively, the width of the coil component 1000 may refer to a minimum value among the dimensions of the plurality of line segments connecting two outermost boundary lines of the coil component 1000, opposing each other in the width direction W, to each other and in parallel to the width direction W. Alternatively, the width of the coil component 1000 may refer to an arithmetic mean value of at least three or more of the dimensions of the plurality of line segments connecting two outermost boundary lines of the coil component 1000, opposing each other in the width direction W, to each other and in parallel to the width direction W. Here, the plurality of line segments parallel to the width direction W may be spaced apart from each other by an equal distance in the length direction L, but an example embodiment thereof is not limited thereto.

Alternatively, each of the length, width and thickness of the coil component 1000 may be measured by a micrometer measurement method. The micrometer measurement method may be of determining a zero point with a gage repeatability and reproducibility (R&R) micrometer, inserting the coil component 1000 in the example embodiment between tips of the micrometer, and measuring by turning a measuring lever of a micrometer. In measuring the length of the coil component 1000 by the micrometer measurement method, the length of the coil component 1000 may refer to a value measured once or may refer to an arithmetic average of values measured a plurality of times, which may be equally applied to the width and thickness of the coil component 1000.

The body 100 may include an insulating resin and a magnetic material. Specifically, the body 100 may be formed by laminating one or more magnetic composite sheets in which a magnetic material is dispersed in an insulating resin. The magnetic material may be ferrite or metallic magnetic powder.

A ferrite powder may be at least one of, for example, spinel-type ferrite such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, hexagonal ferrites such as Ba—Zn-based ferrite, Ba—Mg-based ferrite, Ba—Ni-based ferrite, Ba—Co-based ferrite, Ba—Ni—Co-based ferrite, garnet-type ferrites such as Y-based ferrite, and Li-based ferrites.

Metal magnetic powder may include one or more selected from a group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr-based alloy powder and Fe—Cr—Al alloy powder.

The metal magnetic powder may be amorphous or crystalline. For example, the magnetic metal powder may be a Fe—Si—B—Cr amorphous alloy powder, but an example embodiment thereof is not limited thereto.

Each particle of ferrite and magnetic metal powder may have an average diameter of about 0.1 μm to 30 μm, but an example embodiment thereof is not limited thereto.

The body 100 may include two or more types of magnetic materials dispersed in a resin. Here, the different types of magnetic materials may indicate that the magnetic materials dispersed in the resin may be distinguished from each other by one of an average diameter, composition, crystallinity, and shape.

In the description below, it will be assumed that the magnetic material is a magnetic metal powder, but an example embodiment thereof is not limited to the body 100 having a structure in which magnetic metal powder is dispersed in an insulating resin.

The insulating resin may include epoxy, polyimide, a liquid crystal polymer, or the like, alone or in combination but an example embodiment thereof is not limited thereto.

Referring to FIGS. 1 and 3, a recess R may be formed in the third surface 103 of the body 100.

The recess R may be a region in which the coil 300 is connected to the external electrodes 400 and 500, and may be formed in the third surface 103 of the body 100 and may extend to be in contact with the surface of a PCB on which the coil component 1000 according to the example embodiment is mounted, that is, the sixth surface 106 of the body 100. Also, the recess R may be spaced apart from the fifth surface 105 of the body 100.

Specifically, the recess R may be configured to be formed in the edge region between the third surface 103 and the sixth surface 106 of the body 100, and in example embodiments, the recess R may refer to one region of the third surface 103 of the body 100.

In the example embodiment, the recess R may be formed in the length direction (L direction) in the third surface 103 of the body 100, and may be in contact with each of the first surface 101 and the second surface 102 of the body 100.

That is, in the example embodiment, the recess R may completely cross the third surface 103 of the body 100 in the length direction (L direction) on the third surface 103, and may be formed only in a partial region adjacent to the sixth surface 106 of the body 100 in the thickness direction (T direction).

The recess R may be formed, by pre-dicing, in one surface of a coil bar along a boundary line coinciding with the length direction of each coil component among boundary lines for individualizing the coil components in the coil bar, which is a state before the coil components are individualized. During the pre-dicing, the depth may be adjusted such that a portion of the first lead-out portion 331 and the sub-lead-out portion 342 may be removed together with a portion of the body 100. That is, the depth of pre-dicing may be adjusted such that the first lead-out portion 331 and the sub-lead-out portion 342 are exposed to the recess R.

Referring to FIGS. 1 and 3, in the example embodiment, the recess R in the W-T cross-section may have two perpendicular surfaces, but an example embodiment thereof is not limited thereto. The shape of the recess R may be varied, such as a linear shape, a curved shape, or an irregular shape depending on the shape of a dicing blade or process error.

Also, referring to FIG. 3, the recess R of the example embodiment may not be formed in the fourth surface 104 of the body 100, and may be formed only in the third surface 103 of the body 100 to which the coil 300 is lead out, such that the body 100 may have an asymmetric shape. Accordingly, the coil 300 may be disposed to be relatively adjacent to the fourth surface 104 of the body 100 on which the external electrodes 400 and 500 are not formed, such that parasitic capacitance $C_p$ generated between the coil 300 and the external electrodes 400 and 500 may be reduced. For example, the coil 300 may be disposed to be closer to the fourth surface 104 of the body 100 than the third surface 103 of the body 100 to which the coil 300 is lead out.

Figure 6:
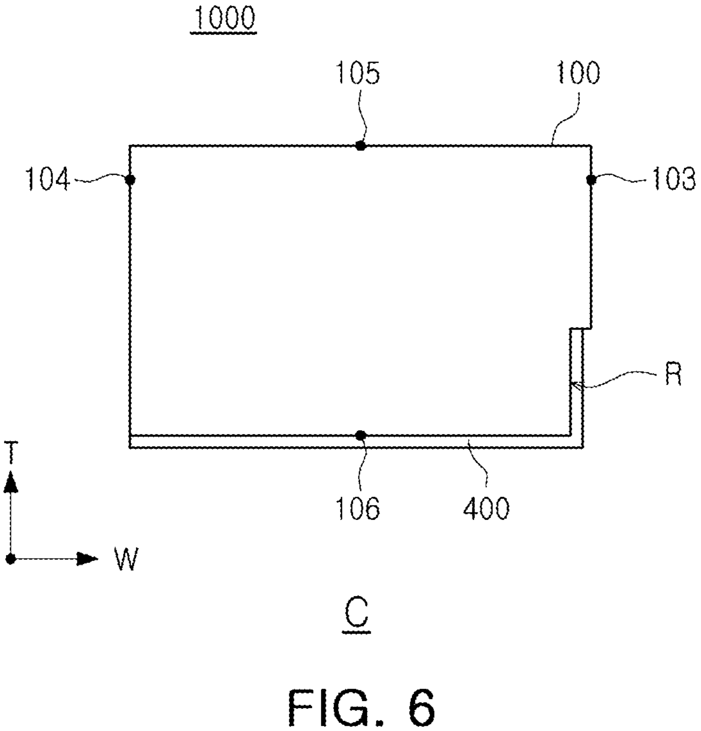
FIG. 6 is a diagram corresponding to FIG. 1, viewed in direction C.

Referring to FIGS. 5 and 6, the recess R may function as a plating guide or plating resist such that, when the external electrodes 400 and 500 are formed by plating, the external electrodes 400 and 500 may not rise in the thickness direction (T direction). Also, since the external electrodes 400 and 500 are disposed on the mounting surface, that is, the sixth surface 106 of the body 100, the portion extending to the other surface of the body 100 may be reduced, such that the effective volume of the coil component 1000 may be increased within the same size and the mounting area may be reduced, which may be advantageous for miniaturization.

Referring to FIGS. 2 to 4, the body 100 may include a support member 200 and a core 110 penetrating the coil 300. The core 110 may be disposed in the central region of an innermost turn of the coil 300, that is, the winding central region of the coil 300.

The core 110 may be formed by filling a through-hole through which a magnetic composite sheet including a magnetic material passes through the center of the coil 300 and the center of the support member 200, but an example embodiment thereof is not limited thereto.

When the other conditions such as the material of the body 100 and the number of turns of the coil 300 are the same, the inductance properties may improve as the cross-sectional area S1 of the core 110 increases.

The support member 200 may be disposed in the body 100. The support member 200 may be configured to support the coil 300. Also, the central portion of the support member 200 may be removed through a trimming process such that a through-hole may be formed, and the core 110 may be disposed in the through-hole. Here, the through-hole formed in the support member 200 may be formed in a shape corresponding to the shape of the innermost turn of the coil 300.

The support member 200 may be formed of a thermosetting insulating resin such as an epoxy resin, a thermoplastic insulating resin such as polyimide, or an insulating material including a photosensitive insulating resin, or an insulating material in which the insulating resin is impregnated with a reinforcing material such as glass fiber or inorganic filler. For example, the support member 200 may be formed of an insulating material such as prepreg, Ajinomoto build-up film (ABF), FR-4, bismaleimide triazine (BT) film, and photo imaginable dielectric (PID) film, but an example embodiment thereof is not limited thereto.

As inorganic fillers, at least one selected from a group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support member 200 is formed of an insulating material including a reinforcing material, the support member 200 may provide more excellent rigidity. When the support member 200 is formed of an insulating material which does not include glass fibers, it may be advantageous to reduce the thickness of the coil component 1000 according to the example embodiment. Also, with respect to the body 100 of the same size, the volume occupied by the coil 300 and/or the magnetic metal powder may be increased, thereby improving component properties. When the support member 200 is formed of an insulating material including a photosensitive insulating resin, the number of processes for forming the coil 300 may be reduced, which may be advantageous in reducing production costs, and fine vias 321 and 322 may be formed.

The thickness of the support member 200 may be, for example, 10 μm or more and 50 μm or less, but an example embodiment thereof is not limited thereto.

The coil 300 may be disposed in the body 100 and may exhibit properties of the coil component 1000. For example, when the coil component 1000 of the example embodiment is used as a power inductor, the coil 300 may maintain an output voltage by storing an electric field as a magnetic field, thereby stabilizing the power of the electronic device.

The coil component 1000 according to the example embodiment may include a coil 300 supported by the support member 200 in the body 100. The coil 300 may have at least one turn wound around the core 110.

Referring to FIGS. 1 to 4, the coil 300 may include first and second coil patterns 311 and 312, a first via 321, and first and second lead-out portions 331 and 332, and may further include a sub-lead-out portion 342 and a second via 322. Specifically, with respect to the direction in FIG. 1, the first coil pattern 311 and the first lead-out portion 331 may be disposed on one surface of the support member 200 opposing the sixth surface 106 of the body 100, and the second coil pattern 312 and the second lead-out portion 332 may be disposed on the other surface of the support member 200 opposing the fifth surface 105 of the body 100.

Referring to FIGS. 1 to 4, each of the first coil pattern 311 and the second coil pattern 312 may have at least one turn about the core 110 as an axis. Each of the first coil pattern 311 and the second coil pattern 312 may have a planar spiral shape.

The first coil pattern 311 may form at least one turn about the core 110 as an axis on one surface of the support member 200. The second coil pattern 312 may form at least one turn about the core 110 as an axis on the other surface of the support member 200.

Referring to FIG. 3, the coil 300 may include a first via 321 penetrating through the support member 200 and connecting the first and second coil patterns 311 and 312 on both surfaces of the support member 200 to each other.

The first via 321 may electrically connect the first and second coil patterns 311 and 312 disposed on both surfaces of the support member 200 to each other.

Specifically, with respect to the direction in FIG. 1, the lower surface of the first via 321 may be connected to the end of the innermost turn of the first coil pattern 311, and the upper surface of the first via 321 may be connected to the end of the innermost turn of the second coil pattern 312.

Referring to FIGS. 1, 2, and 5, the coil 300 may include first and second lead-out portions 331 and 332 extending to the third surface 103 of the body 100.

The first lead-out portion 331 may be connected to the first coil pattern 311 and may extend to the third surface 103 of the body 100, and may be connected to a first external electrode 400. Here, since the first lead-out portion 331 is in contact with the recess R of the third surfaces 103 of the body 100, the first lead-out portion 331 may be in direct contact with the first external electrode 400 disposed in the recess R.

The second lead-out portion 332 may be connected to the second coil pattern 312 and may extend to the third surface 103 of the body 100, and may be connected to the second external electrode 500. Here, since the second lead-out portion 332 is in contact with the region of the third surface 103 of the body 100 in which the recess R is not formed, the second lead-out portion 332 may not be in direct contact with and connected to the second external electrode 500 disposed in the recess R, and may be connected through a sub-lead-out portion 342.

Referring to FIGS. 1, 2 and 5, the sub-lead-out portion 342 may be disposed on one surface of the support member 200 in a shape corresponding to the second lead-out portion 332 and may be in contact with the recess R, and may be in direct contact with and connected to the second external electrode 500 disposed in the recess R. That is, the sub-lead-out portion 342 may be configured to electrically connect the second lead-out portion 332 to the second external electrode 500.

The sub-lead-out portion 342 may be disposed on one surface of the support member 200 and may be spaced apart from the first coil pattern 311. That is, the sub-lead-out portion 342 and the first coil pattern 311 may be disposed on the same surface of the support member 200.

Since the sub-lead-out portion 342 may be an electrical path between the second lead-out portion 332 and the second external electrode 500, the side in the width direction (W direction) may be adjusted depending on desired Rdc properties or inductance properties.

Referring to FIGS. 1, 2, and 5, the second via 322 may connect the second lead-out portion 332 to the sub-lead-out portion 342. Since the second lead-out portion 332 and the sub-lead-out portion 342 are spaced apart from each other with respect to the support member 200, the second lead-out portion 332 and the sub-lead-out portion 342 may be connected to each other through a second via 322 penetrating the support member 200.

Accordingly, the input from the first external electrode 400 may pass through the first lead-out portion 331, the first coil pattern 311, the first via 321, the second coil pattern 312, the second lead-out portion 331, the second lead-out portion 332, the second via 322, and the sub-lead-out portion 342 in sequence and may be output to the second external electrode 500.

Accordingly, the coil 300 may function as a single coil between the first and second external electrodes 400 and 500.

Referring to FIGS. 2 and 3, the distance G3 between a winding portion comprising coil patterns of the coil 300 and the third surface 103 of the body 100 may be greater than the distance G4 between the winding portion comprising coil patterns of the coil 300 and the fourth surface 104 of the body 100.

For example, coil 300 may be disposed in the body 100 such that the ratio G3/G4 of the distance G3 between the winding portion of the coil 300 and the third surface 103 of the body 100 to the distance G4 between the winding portion of the coil 300 and the fourth surface 104 of the body 100 may have a value of 1.5 or more and 3 or less.

Assuming the coil component 1000 of the same size, when the ratio (G3/G4) of the distance G3 between the winding portion of the coil 300 and the third surface 103 of the body 100 to the distance G4 between the winding portion of the coil 300 and the fourth surface 104 of the body 100 is greater than 3, it may be difficult to secure a dicing margin for dividing into individual components, and when the ratio is less than 1.5, the effect of reducing parasitic capacitance $C_p$ may not be prominent. Accordingly, the ratio (G3/G4) of the distance G3 between the winding portion of the coil 300 and the third surface 103 of the body 100 to the distance G4 between the winding portion of the coil 300 and the fourth surface 104 of the body 100 may be preferably 1.5 or more and 3 or less, but an example embodiment thereof is not limited thereto.

As an example, the distance G4 between the winding portion of the coil 300 and the fourth surface 104 of the body 100 may be in the range of 50 μm to 70 μm, and the distance G3 between the winding portion of the coil 300 and the third surfaces 103 of the body 100 may be in the range of 125 μm to 180 μm, but an example embodiment thereof is not limited thereto.

Here, the distance G3 between the winding portion of the coil 300 and the third surface 103 of the body 100 may refer to, for example, an arithmetic mean value of at least three or more of the dimensions of a plurality of line segments connecting an outermost boundary line of the second coil pattern 312 and a boundary line of the third surface 103 of the body 100, opposing each other in the width direction W, to each other and in parallel to the width direction W, with respect to an optical microscope image or a scanning electron microscope (SEM) image for an L-W cross-section on which the second coil pattern 312 is visible, taken from the central portion of the coil component 1000 taken in the thickness direction T. Here, the plurality of line segments parallel to the width direction W may be spaced spart from each other by an equal distance in the length direction L, but an example embodiment thereof is not limited thereto.

The distance G4 between the winding portion of the coil 300 and the fourth surface 104 of the body 100 may be measured by the same method of measuring the distance G3 between the winding portion of the coil 300 and the third surface 103 of the body 100 described above.

Through the above structure, the distance between the coil patterns 311 and 312 and the external electrodes 400 and 500 may be increased in the coil component 1000 of the same size, such that parasitic capacitance $C_p$ generated between the coil patterns 311 and 312 and the external electrodes 400 and 500 may be reduced, and accordingly, self-resonant frequency (SRF) may be increased.

Referring to FIGS. 2 and 4, the distance G3 between the winding portion of the coil 300 and the third surface 103 of the body 100 may be configured to be greater than the distance G1 between the winding portion of the coil 300 and the first surface 101 of the body 100 and/or the distance G2 between the winding portion of the coil 300 and the second surface 102 of the body 100.

As an example, the distance G1 between the winding portion of the coil 300 and the first surface 101 of the body 100 and/or the distance G2 between the winding portion of the coil 300 and the second surface 102 of the body 100 may be less than the distance G3 between the winding portion of the coil 300 and the third surface 103 of the body 100, and may be substantially the same as the distance G4 between the winding portion of the coil 300 and the fourth surface 104 of the body 100. Here, the configuration in which the distances are substantially the same may include process errors or positional deviations occurring during the manufacturing process, and errors during measurement. The distance G1 between the winding portion of the coil 300 and the first surface 101 of the body 100 and the distance G2 between the winding portion of the coil 300 and the second surface 102 of the body 100 may be measured by the same method of measuring the distance G3 between the winding portion of the coil 300 and the third surface 103 of the body 100.

Through this structure, in the coil component 1000 according to the example embodiment, the distance G3 between the winding portion of the coil 300 and the third surface 103 of the body 100 may be widened, such that parasitic capacitance $C_p$ occurring between the coil patterns 311 and 312 and the external electrodes 400 and 500 may be decreased, and the distances G1, G2, and G4 between the winding portion of the coil 300 and the first, second, and fourth surfaces 101, 102, and 104 of the body may be reduced within a range in which the magnetic flux flow is not impeded.

Referring to FIG. 2, the distance D1 between the first lead-out portion 311 and the second lead-out portion 312 in the length direction (first direction) may be uniformly formed in the region between the internal side of the body 100 and the third surfaces 103 of the body 100.

Specifically, since the first lead-out portion 311 and the second lead-out portion 312 extend to the third surface 103 of the body 100 in parallel with the width direction (second direction), the distance D1 between the first lead-out portion 311 and the second lead-out portion 312 may be substantially the same from the internal portion of the body 100 to the third surface 103 of the body 100. Here, the configuration in which the distance is substantially the same may include process errors or positional deviations occurring during the manufacturing process, and errors during measurement.

Here, the distance D1 between the first lead-out portion 311 and the second lead-out portion 312 in the length direction (first direction) may refer to, for example, an arithmetic mean value of at least three or more of the dimensions of a plurality of line segments connecting an outermost boundary line (an outermost boundary line of the support member 200) of the first lead-out portion 331 and an outermost boundary line of the second lead-out portion 332, opposing each other in the length direction L, to each other and in parallel to the length direction L, with respect to an optical microscope image or a scanning electron microscope (SEM) image for an L-W cross-section on which the second coil pattern 312 is visible, taken from the central portion of the coil component 1000 taken in the thickness direction T. Here, the plurality of line segments parallel to the length direction L may be spaced spart from each other by an equal distance in the width direction W, but an example embodiment thereof is not limited thereto.

At least one of the first and second coil patterns 311 and 312, the first and second vias 321 and 322, the first and second lead-out portions 331 and 332, and the sub-lead-out portion 342 may include at least one conductive layer.

For example, referring to FIGS. 3 to 4, when the first coil pattern 311, the first via 321, the first lead-out portion 331, and the sub-lead-out portion 342 are formed on one surface of the support member 200 by plating, each of the first coil pattern 311, the first via 321, the first lead-out portion 331, and the sub-lead-out portion 342 may include a seed layer 310 and an electrolytic plating layer. Here, the electroplating layer may have a single-layer structure or a multiple-layer structure. The electrolytic plating layer having a multilayer structure may be formed in a conformal film structure in which an electroplating layer is formed along the surface of the other electroplating layer, or an electroplating layer may be laminated only on the other surface of one electroplating layer. The seed layer 310 may be formed by an electroless plating method or a vapor deposition method such as sputtering. The seed layers 310 of the first coil pattern 311, the first via 321, and the first lead-out portion 331 may be integrally formed such that a boundary may not be formed therebetween, but an example embodiment thereof is not limited thereto. The electroplating layers of the first coil pattern 311, the first via 321, and the first lead-out portion 331 may be integrally formed such that a boundary may not be formed therebetween, but an example embodiment thereof is not limited thereto.

Each of the first coil pattern 311, the first via 321, the first lead-out portion 331, and the sub-lead-out portion 342 may be formed of a conductive material such as copper (Cu), aluminum (Al), silver (Ag), tin (Sn), gold (Au), nickel (Ni), lead (Pb), titanium (Ti), chromium (Cr), or an alloy thereof, but an example embodiment thereof is not limited thereto.

In one example, the winding portion may have a line width t1 substantially the same as a line with t2 of the first and second lead-out portions and the sub-lead-out portion 342. As such, the distance between the region through which the external electrodes 400 and 500 and the lead-out portions 331 and 332 are energized and the coil patterns 311 and 312 may increase, as compared to an example in which a line width of lead-out portions increases, such that the effect of reducing parasitic capacitance $C_p$ may increase.

Referring to FIGS. 3 to 4, the coil component 1000 according to the example embodiment may further include an insulating film IF. The insulating film IF may integrally cover the coil 300 and the support member 200.

Specifically, the insulating film IF may be disposed between the coil 300 and the body 100 and between the support member 200 and the body 100. The insulating film IF may be formed along the surface of the support member 200 on which the first and second coil patterns 311 and 312 and the first and second lead-out portions 331 and 332 are disposed, but an example embodiment thereof is not limited thereto.

The insulating film IF may fill the regions between adjacent turns of the first and second coil patterns 311 and 312 and between the first and second lead-out portions 331 and 332 and the first and second coil patterns 311 and 312, respectively, and may insulate the coil turns from each other.

The insulating film IF may be provided to insulate the coil 300 from the body 100, and may include a well-known insulating material such as parylene, but an example embodiment thereof is not limited thereto. As another example, the insulating film IF may include an insulating material such as an epoxy resin other than parylene. The insulating film IF may be formed by vapor deposition, but an example embodiment thereof is not limited thereto. As another example, the insulating film IF may be formed by laminating and curing an insulating film on the support member 200 on which the coil 300 is disposed, or may be formed by coating and curing an insulating paste on both surfaces of the support member 200 on which the coil 300 is disposed. Accordingly, the insulating film IF may not be provided in the example embodiment. That is, in the case in which the body 100 has sufficient electrical resistance at the designed operating current and voltage of the coil component 1000 according to the example embodiment, the insulating film IF may not be provided in the example embodiment.

The first and second external electrodes 400 and 500 may be spaced apart from each other on the sixth surface 106 of the body 100 and may be connected to the coil 300. Specifically, the first external electrode 400 may be disposed on the sixth surface 106 of the body 100, may extend into the recess R of the third surface 103 and may be in contact with and connected to the first lead-out portion 331, and the second external electrode 500 may be disposed on the sixth surface 106 of the body 100, may extend to the recess R of the third surface 103 and may be in contact with and connected to the sub-lead-out portion 342.

Referring to FIGS. 1 and 4 to 6, the coil component 1000 according to the example embodiment may have a structure in which the first and second external electrodes 400 spaced apart from each other on the sixth surface 106 of the body 100 may extend only to the recess R of the third surface 103 of the body 100. Through this structure, the volume occupied by the external electrodes 400 and 500 in the coil component 1000 may be reduced such that the effective volume may be increased.

In this case, the first external electrode 400 may include a first pad portion disposed on the sixth surface 106 of the body 100, and a first extension portion disposed on the recess R and connecting the first lead-out portion 331 to the first pad portion.

Also, the second external electrode 500 may include a second pad portion spaced apart from the first pad portion on the sixth surface 106 of the body 100, and a second extension portion spaced apart from the first extension portion in the recess R of the third surface 103 of the body 100 and connecting the sub-lead-out portion 342 to the second pad portion.

The pad portion and the extension portion may be formed together in the same process and may be integrated with each other without forming a boundary therebetween, but an example embodiment thereof is not limited thereto.

The external electrodes 400 and 500 may be formed by a vapor deposition method such as sputtering and/or a plating method, but an example embodiment thereof is not limited thereto.

The external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or an alloy thereof, but an example embodiment thereof is not limited thereto.

The external electrodes 400 and 500 may be formed in a single-layer structure or multiple-layer structure. For example, the external electrodes 400 and 500 may include a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may be formed to cover the first conductive layer, but an example embodiment thereof is not limited thereto. The first conductive layer may be a plating layer or a conductive resin layer formed by coating and curing a conductive resin including a conductive powder including at least one of copper (Cu) and silver (Ag) and a resin. The second and third conductive layers may be configured as plating layers, but an example embodiment thereof is not limited thereto.

The coil component 1000 according to the example embodiment may further include an external insulating layer disposed on the first to sixth surfaces 101, 102, 103, 104, 105, and 106 of the body 100. The external insulating layer may be disposed in a region other than the region of the surface of the body 100 in which the external electrodes 400 and 500 are disposed.

At least a portion of the external insulating layers disposed on the first to sixth surfaces 101, 102, 103, 104, 105, and 106 of the body 100, respectively, may be formed in the same process and may be integrated with each other without forming a boundary therebetween, but an example embodiment thereof is not limited thereto.

The external insulating layer may be formed by forming an insulating material for forming the external insulating layer by a method such as a printing method, vapor deposition, spray application method, film lamination method, or the like, but an example embodiment thereof is not limited thereto.

The external insulating layer may include a thermoplastic resin such as polystyrene resin, vinyl acetate resin, polyester resin, polyethylene resin, polypropylene resin, polyamide resin, rubber resin, acrylic resin, a thermosetting resin such as phenolic resin, epoxy resin, urethane resin, melamine resin, and alkyd resin, a photosensitive resin, parylene, $SiO_x$, or $SiN_x$. The outer insulating layer may further include an insulating filler such as an inorganic filler, but an example embodiment thereof is not limited thereto.

Second and Third Embodiment

Figure 7:
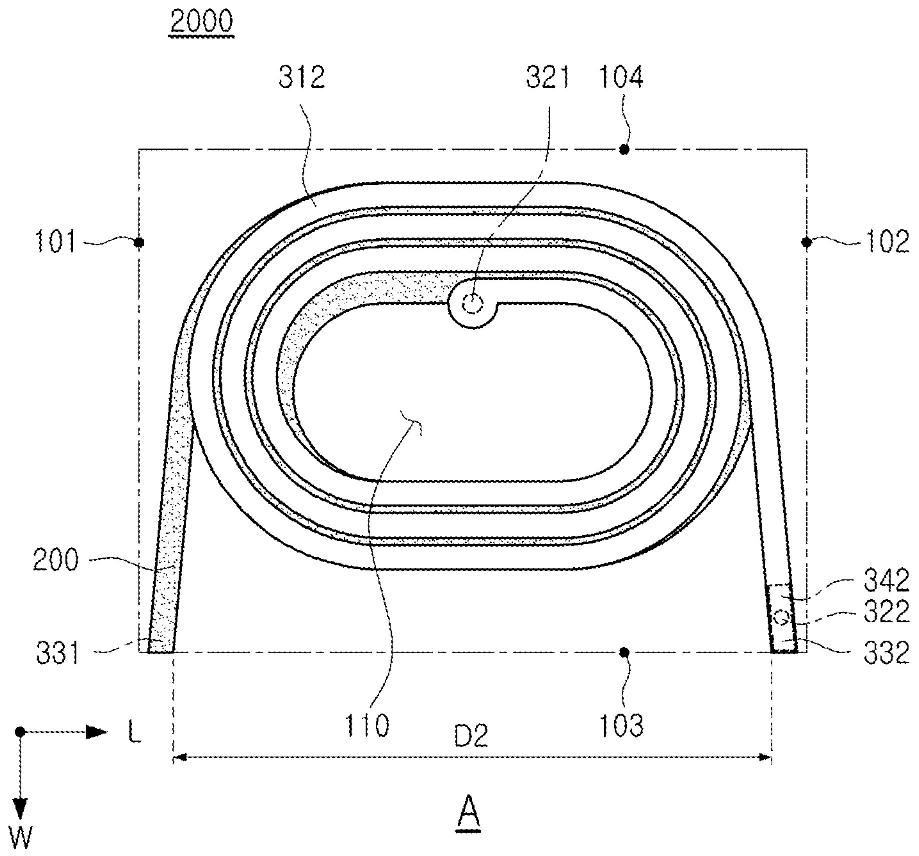
FIG. 7 is a diagram illustrating a coil component according to a second embodiment of the present disclosure, corresponding to FIG. 2.
Figure 8:
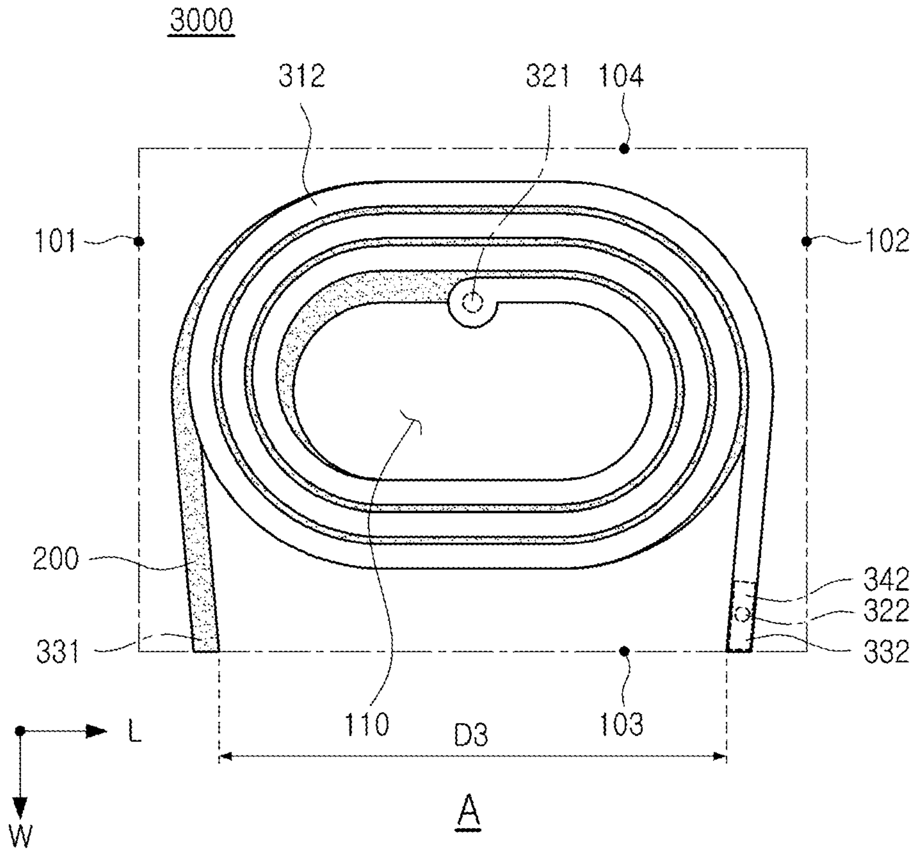
FIG. 8 is a diagram illustrating a coil component according to a third embodiment of the present disclosure, corresponding to FIG. 2.

FIG. 7 is a diagram illustrating a coil component 2000 according to a second embodiment of the present disclosure, corresponding to FIG. 2. FIG. 8 is a diagram illustrating a coil component 3000 according to a third embodiment of the present disclosure, corresponding to FIG. 2.

The coil components 2000 and 3000 according to the second and third embodiments may be different from the coil portion 1000 according to the first embodiment in that the distance between the first and second lead-out portions 331 and 332 may be different in the coil components 2000 and 3000.

Therefore, in the description of the example embodiment, only the distance between the first and second lead-out portions 331 and 332 different from the first embodiment will be described. For the rest of the components of the example embodiment, the description in the first embodiment may be applied as is.

Referring to FIG. 7, in the coil component 2000 according to the second embodiment, the distance D2 between the first lead-out portion 311 and the second lead-out portion 312 in the length direction (first direction) may increase from the internal side of the body 100 toward the third surface 103 of the body 100. That is, the distance D2 between the first lead-out portion 311 and the second lead-out portion 312 in the length direction (first direction) may decrease toward the core 110, and may have a maximum value on the third surface 103 of the body 100.

Through this structure, the distance between the region through which the external electrodes 400 and 500 and the lead-out portions 331 and 332 are energized and the coil patterns 311 and 312 may further increase, such that the effect of reducing parasitic capacitance $C_p$ may further increase.

Referring to FIG. 8, in the coil component 3000 according to the third embodiment, the distance D3 between the first lead-out portion 311 and the second lead-out portion 312 in the length direction (first direction) may decrease from the internal side of the body 100 toward the third surface 103 of the body 100. That is, the distance D3 between the first lead-out portion 311 and the second lead-out portion 312 in the length direction (first direction) may increase toward the core 110, and may have a minimum value on the third surface 103 of the body 100.

Through this structure, defects such as chipping or an exposed side surface of the lead-out portions 331 and 332 while dicing into individual portions may be addressed.

Fourth Embodiment

Figure 9:
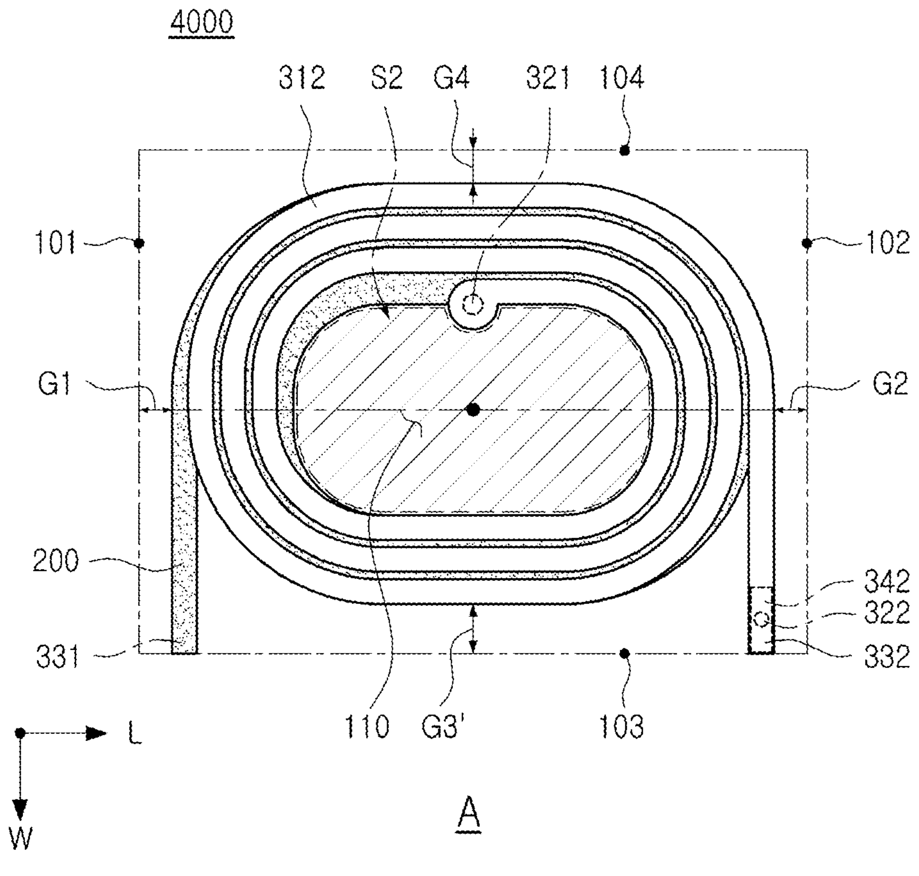
FIG. 9 is a diagram illustrating a coil component according to a fourth embodiment of the present disclosure, corresponding to FIG. 2.

FIG. 9 is a diagram illustrating a coil component 4000 according to a fourth embodiment of the present disclosure, corresponding to FIG. 2.

The coil component 4000 according to the fourth embodiment may be different from the coil component 1000 according to the first embodiment in that the distance G3' between the winding portion of the coil 300 and the third surface 103 of the body 100 and the cross-sectional area S2 of the core 110 may be different in the coil component 4000.

Therefore, in describing the example embodiment, only the distance G3' between the winding portion of the coil 300 and the third surface 103 of the body 100 different from the first embodiment and the cross-sectional area S2 of the core 110 will be described. For the rest of the components of the example embodiment, the description in the first embodiment may be applied as is.

Referring to FIGS. 2 and 9, in the coil component 4000 according to the fourth embodiment, the distance G3' from the winding portion of the third surface 103 of the body 100 may be narrower than in the first embodiment, and the area S2 of the core 110 may be larger than in the first embodiment.

That is, the smaller the ratio (G3/G4) of the distance G3 between the winding portion of the coil 300 and the third surface 103 of the body 100 to the distance G4 between the winding portion of the coil 300 and the fourth surface 104 of the body 100, the larger the cross-sectional areas S1 and S2 of the core 110 may be.

Through this structure, parasitic capacitance $C_p$ generated between the coil patterns 311 and 312 and the external electrodes 400 and 500 may be reduced, and also the distance between the coil 300 and the surface of the body 100 may be reduced, such that the area of the core 110 in the center of the coil 300 having the same number of turns may be increased. Accordingly, high self-resonant frequency (SRF) may be obtained, inductance properties may improve.

According to the aforementioned example embodiments, parasitic capacitance $C_p$ generated between the coil and the external electrode in the coil component may be reduced, such that self-resonant frequency (SRF) may increase.

Also, the decrease in effective volume due to the formation of the recess may be reduced and the volume of the core may increase, such that inductance properties and Isat properties of the coil component may improve.

While the example embodiments have been illustrated and described above, it will be apparent to those skilled in the art that modifications and variations could be made without departing from the scope of the present disclosure as defined by the appended claims.

What is claimed is:

1. A coil component, comprising:

a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface;

a support member disposed in the body;

a coil disposed on the support member and including first and second lead-out portions extending to the third surface of the body; and first and second external electrodes disposed on the sixth surface of the body, extending into the recess and connected to the first and second lead-out portions, respectively;

wherein a distance G3 between a winding portion of the coil and the third surface of the body is wider than a distance G4 between the winding portion of the coil and the fourth surface of the body.

2. The coil component of claim 1, wherein the coil further includes a sub-lead-out portion connecting the second lead-out portion to the second external electrode.

3. The coil component of claim 2, wherein the first lead-out portion and the sub-lead-out portion are disposed on the same surface of the support member.

4. The coil component of claim 2, wherein the first and second lead-out portions are disposed on one surface and the other surface of the support member, respectively, and wherein the sub-lead-out portion is disposed on the one surface of the support member.

5. The coil component of claim 2, wherein the coil includes a first coil pattern disposed on one surface of the support member and connected to the first lead-out portion, a second coil pattern disposed on the other surface of the support member and connected to the second lead-out portion, and a first via connecting the first and second coil patterns to each other, and wherein the first coil pattern and the sub-lead-out portion are spaced apart from each other on the one surface of the support member.

6. The coil component of claim 2, wherein the coil further includes a second via connecting the second lead-out portion to the sub-lead-out portion.

7. The coil component of claim 1, wherein a ratio G3/G4 is 1.5 or more and 3 or less.

8. The coil component of claim 1, wherein a distance between the first and second lead-out portions in the first direction is constant in a region between an internal side of the body and the third surface of the body.

9. The coil component of claim 1, wherein a core penetrating through the support member is disposed in a winding center of the coil, and wherein the smaller a ratio (G3/G4) of a distance G3 between a winding portion of the coil and the third surface of the body to a distance G4 between the winding portion of the coil and the fourth surface of the body, the larger a cross-sectional area of the core.

10. The coil component of claim 1, wherein the recess is formed in the first direction on the third surface of the body.

11. The coil component of claim 1, wherein the recess is recessed in a region between the support member and the sixth surface of the body with respect to the third direction.

12. A coil component, comprising:

a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface;

a support member disposed in the body;

a coil disposed on the support member and including first and second lead-out portions extending to the third surface of the body; and first and second external electrodes disposed on the sixth surface of the body, extending into the recess and connected to the first and second lead-out portions, respectively; and wherein a distance G3 between a winding portion of the coil and the third surface of the body is wider than a distance G1 between the winding portion of the coil and the first surface of the body or a distance G2 between the winding portion of the coil and the second surface of the body.

13. A coil component, comprising:

a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface;

a support member disposed in the body;

a coil disposed on the support member and including first and second lead-out portions extending to the third surface of the body; and first and second external electrodes disposed on the sixth surface of the body, extending into the recess and connected to the first and second lead-out portions, respectively; and wherein a distance between the first and second lead-out portions in the first direction increases from an internal side of the body toward the third surface of the body.

14. A coil component, comprising:

a body including a first surface and a second surface opposing each other in a first direction, a third surface and a fourth surface opposing each other in a second direction perpendicular to the first direction, and a fifth surface and a sixth surface opposing each other in a third direction perpendicular to the first direction and the second direction, and including a recess in the third surface;

a support member disposed in the body;

a coil disposed on the support member and including first and second lead-out portions extending to the third surface of the body; and first and second external electrodes disposed on the sixth surface of the body, extending into the recess and connected to the first and second lead-out portions, respectively; and wherein a distance between the first and second lead-out portions in the first direction decreases from an internal side of the body toward the third surface of the body.

15. A coil component, comprising:

a body including a first surface and a second surface opposing each other in a first direction, a third surface and a fourth surface opposing each other in a second direction, and a fifth surface and a sixth surface opposing each other in a third direction;

a support member disposed in the body;

a coil disposed on the support member and including a winding portion and first and second lead-out portions extending from the winding portion to the third surface of the body; and first and second external electrodes disposed on the sixth surface of the body and connected to the first and second lead-out portions, respectively, wherein a distance G3 between the winding portion of the coil and the third surface of the body is wider than a distance G4 between the winding portion of the coil and the fourth surface of the body, and the winding portion has a line width substantially the same as a line with of the first and second lead-out portions.

16. The coil component of claim 15, wherein the coil further includes a sub-lead-out portion connecting the second lead-out portion to the second external electrode.

17. The coil component of claim 16, wherein the first lead-out portion and the sub-lead-out portion are disposed on the same surface of the support member.

18. The coil component of claim 16, wherein the first and second lead-out portions are disposed on one surface and the other surface of the support member, respectively, and wherein the sub-lead-out portion is disposed on the one surface of the support member.

19. The coil component of claim 15, wherein a ratio G3/G4 is 1.5 or more and 3 or less.

20. The coil component of claim 15, wherein G3 is wider than a distance G1 between the winding portion of the coil and the first surface of the body or a distance G2 between the winding portion of the coil and the second surface of the body.

* * * * *